(12) United States Patent
Zhang et al.

(10) Patent No.: US 12,381,827 B2
(45) Date of Patent: Aug. 5, 2025

(54) DATA SENDING METHOD AND COMMUNICATION APPARATUS

(71) Applicant: Huawei Technologies Co., Ltd., Shenzhen (CN)

(72) Inventors: Haibo Zhang, Beijing (CN); Feilong Tang, Shanghai (CN); Xuhui Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 18/534,159

(22) Filed: Dec. 8, 2023

(65) Prior Publication Data

US 2024/0187334 A1    Jun. 6, 2024

Related U.S. Application Data

(63) Continuation of application No. PCT/CN2021/099847, filed on Jun. 11, 2021.

(51) Int. Cl.
*H04L 47/283* (2022.01)
*H04L 47/25* (2022.01)
*H04L 47/263* (2022.01)

(52) U.S. Cl.
CPC ............ *H04L 47/283* (2013.01); *H04L 47/25* (2013.01); *H04L 47/263* (2013.01)

(58) Field of Classification Search
CPC . H04L 43/0829; H04L 43/0864; H04L 43/10; H04L 43/103; H04L 43/106; H04L 47/25; H04L 47/263; H04L 47/283
See application file for complete search history.

(56) References Cited

U.S. PATENT DOCUMENTS

| 2010/0315958 | A1  | 12/2010 | Luo et al. | |
| 2021/0007004 | A1* | 1/2021 | Xu | ............ H04L 47/263 |
| 2021/0029041 | A1* | 1/2021 | Yuan | .............. H04L 47/283 |

FOREIGN PATENT DOCUMENTS

CN    107171969 A    9/2017

* cited by examiner

*Primary Examiner* — Vivek Srivastava
*Assistant Examiner* — William C McBeth
(74) *Attorney, Agent, or Firm* — Conley Rose, P.C.

(57) ABSTRACT

A method includes determining a first data sending rate based on multiple round-trip times (RTTs), where the multiple RTTs include RTTs of a plurality of first probe packets sent at different sending rates, and the first sending rate is a sending rate corresponding to an RTT that is in the multiple RTTs and that is less than a first preset threshold; determining a second sending rate based on a plurality of packet loss rates, where the packet loss rates include packet loss rates of a plurality of second probe packets sent at different sending rates, and the second sending rate is a sending rate corresponding to a packet loss rate that is less than a second preset threshold; and sending a third probe packet at a third sending rate.

20 Claims, 7 Drawing Sheets

DATA SENDING METHOD AND COMMUNICATION APPARATUS

CROSS-REFERENCE TO RELATED APPLICATIONS

This is a continuation of International Patent Application No. PCT/CN2021/099847 filed on Jun. 11, 2021, which is hereby incorporated by reference in its entirety.

TECHNICAL FIELD

This disclosure relates to the communication field, and in particular, to a data sending method and a communication apparatus.

BACKGROUND

Ultra-fast terminal network positioning can provide an ultra-fast interconnection experience, and is an underlying basic connection technology for a future terminal. Ultra-fast terminal networks implement an optimal network experience with no packet loss and an ultra-low delay based on combined technical innovation of active network technologies of mobile terminals and servers. One of the core indicators of the future terminal is an extremely high requirement on a network delay, and therefore a low delay becomes a key point of network-based interactive services.

An active congestion control mechanism can be used to ensure that data sending is adjusted packet by packet, link bandwidth is occupied fairly, without packet loss and having a low delay. However, the active congestion control mechanism requires that all devices on a link support a committed access rate (CAR) mechanism. This requirement cannot be met on a live network. Some devices on the link may not support the CAR mechanism. If there are some devices that cannot be configured with a CAR on the network, congestion occurs on these devices, and the active congestion control mechanism becomes invalid. In addition, the active congestion control mechanism cannot respond to congestion on intermediate devices configured with no CAR. This may increase the delay and even cause packet loss.

SUMMARY

Embodiments of this disclosure provide a data sending method and a communication apparatus, to reduce a data transmission delay.

According to a first aspect, a data sending method and a communication apparatus are provided. The method includes determining a first sending rate based on multiple round-trip times (RTTs), where the multiple RTTs include RTTs of a plurality of first probe packets sent at different sending rates, and the first sending rate is a sending rate corresponding to an RTT that is in the multiple RTTs and that is less than a first preset threshold, determining a second sending rate based on a plurality of packet loss rates, where the plurality of packet loss rates include packet loss rates of a plurality of second probe packets sent at different sending rates, and the second sending rate is a sending rate corresponding to a packet loss rate that is less than a second preset threshold, and sending a third probe packet at a third sending rate, where the third probe packet is used to determine a sending interval of a data packet, and the third sending rate is a smaller value of the first sending rate and the second sending rate.

Based on the foregoing technical solution, the first sending rate corresponding to a smaller round-trip time is determined based on the round-trip times of the plurality of first probe packets. A smaller round-trip time indicates fewer congestion cases of the first probe packet on a transmission link, and a shorter transmission delay. The second sending rate corresponding to a smaller packet loss rate of the second probe packet is determined based on a packet loss rate of the second probe packet. A smaller packet loss rate indicates fewer congestion cases of the second probe packet on a transmission link, and a shorter transmission delay. The smaller value of the first sending rate and the second sending rate is a sending rate for sending the third probe packet used to determine the sending interval of the data packet. According to the method, a sending rate of a probe packet is determined, to control the sending interval of the data packet, so that congestion on the transmission link can be effectively reduced, and a data transmission delay can be reduced.

With reference to the first aspect, in some implementations of the first aspect, the first probe packet includes sending time information, and the sending time information indicates a sending moment of the first probe packet.

The RTT is determined based on the sending moment and a receiving moment of one first probe packet, the receiving moment is a moment at which a first feedback packet is received, and the first feedback packet is a feedback packet corresponding to the first probe packet.

With reference to the first aspect, in some implementations of the first aspect, one of the plurality of first probe packets is sent. The first probe packet includes time information, and the time information indicates a sending moment of the first probe packet. The first feedback packet is received. The first feedback packet is a feedback packet of the first probe packet. The feedback packet includes the time information. The RTT is determined based on the sending moment and the receiving moment of the feedback packet.

Based on the foregoing solution, the first probe packet can carry the time information indicating the sending moment of the first probe packet. After receiving the first probe packet, a receiving end sends the first feedback packet. The first feedback packet includes the time information, so that after receiving the first feedback packet fed back by the receiving end, a transmitting end can determine the sending moment of the first probe packet based on the time information. The RTT can be obtained based on the sending moment and the receiving moment of the first feedback packet.

With reference to the first aspect, in some implementations of the first aspect, the method further includes receiving a second feedback packet. The second feedback packet is a feedback packet corresponding to the third probe packet.

The second feedback packet includes an acknowledgement (ACK) message, and the ACK message is used to acknowledge whether a data packet sent before the third probe packet is successfully received.

Based on the foregoing solution, the probe packet carries the ACK message of the data packet, so that the probe packet can not only have a function of probing a path and determining the sending interval of the data packet, but also carry the ACK message of the data packet. This can prevent the receiving end from sending a feedback message in addition to returning the probe packet, reduce signaling overheads and improve resource utilization. Further, fast retransmission can be implemented, and no matter whether the data packets are sparse or dense, there is no need to wait for a long retransmission timeout (RTO).

With reference to the first aspect, in some implementations of the first aspect, the ACK message includes identification information of a first data packet and/or identification information of a second data packet. The first data packet is a last data packet that is successfully received before the second feedback packet, and the second data packet is a next to-be-received data packet.

With reference to the first aspect, in some implementations of the first aspect, the ACK message includes the identification information of the second data packet, and the method further includes sending a next to-be-sent data packet when the second data packet is sent before a first time interval and the first time interval is less than k times a first RTT, where the first RTT is an RTT corresponding to the third sending rate, and $0<k\leq 1$, or sending the second data packet when the second data packet is sent before a second time interval, and the second time interval is greater than or equal to k times the first RTT, or sending the second data packet when the second data packet is not sent.

Based on the foregoing solution, the second data packet can be considered as a next data packet that the receiving end expects to receive. If the receiving end expects that the data packet sent by the transmitting end is a data packet that has already been sent, and sending time exceeds specific time, the transmitting end sends the second data packet again, so that fast retransmission can be implemented. Alternatively, if sending time of the second data packet does not exceed the specific time, it can be considered that the second data packet is still not sent to the receiving end in a transmission path, and the transmitting end can send a next to-be-sent data packet. If the second data packet has not been sent, the transmitting end can send the second data packet that the receiving end expects to receive. Fast retransmission can be implemented, and a data transmission delay can be reduced.

With reference to the first aspect, in some implementations of the first aspect, the method further includes sending a third data packet if a first ACK message is not received in a first RTT after the third data packet is sent. The first RTT is an RTT corresponding to the third sending rate, and the first ACK message is used to acknowledge that the third data packet is successfully received.

Based on the foregoing solution, if the transmitting end does not receive, in the RTT corresponding to the third sending rate after sending the third data packet, an ACK message corresponding to the third data packet, the transmitting end sends the third data packet again. Fast retransmission can be implemented, and a transmission delay of a data packet can be reduced.

According to a second aspect, a communication apparatus is provided. In a design, the apparatus may include modules corresponding to the methods/operations/steps/actions described in the first aspect. The modules may be implemented by using a hardware circuit, may be software, or a combination of the hardware circuit and software. In a design, the apparatus includes a processing unit configured to determine a first sending rate based on round-trip times multiple RTTs, where the multiple RTTs include RTTs of a plurality of first probe packets sent at different sending rates, and the first sending rate is a sending rate corresponding to an RTT that is in the multiple RTTs and that is less than a first preset threshold, and the processing unit is further configured to determine a second sending rate based on a plurality of packet loss rates, where the plurality of packet loss rates include packet loss rates of a plurality of second probe packets sent at different sending rates, and the second sending rate is a sending rate corresponding to a packet loss rate that is in the plurality of packet loss rates and that is less than a second preset threshold, and a transceiver unit configured to send a third probe packet at a third sending rate, where the third probe packet is used to determine a sending interval of a data packet, and the third sending rate is a smaller value of the first sending rate and the second sending rate.

With reference to the second aspect, in some implementations of the second aspect, the first probe packet includes sending time information. The sending time information indicates a sending moment of the first probe packet. The RTT is determined based on the sending moment and a receiving moment of one first probe packet. The receiving moment is a moment at which a first feedback packet is received. The first feedback packet is a feedback packet corresponding to the first probe packet.

With reference to the second aspect, in some implementations of the second aspect, the transceiver unit is further configured to receive a second feedback packet. The second feedback packet is a feedback packet corresponding to the third probe packet. The second feedback packet includes an ACK message, and the ACK message is used to acknowledge whether a data packet sent before the third probe packet is successfully received.

With reference to the second aspect, in some implementations of the second aspect, the ACK message includes identification information of a first data packet and/or identification information of a second data packet. The first data packet is a last data packet that is successfully received before the second feedback packet, and the second data packet is a next to-be-received data packet.

With reference to the second aspect, in some implementations of the second aspect, the ACK message includes the identification information of the second data packet, and the processing unit is further configured to send a next to-be-sent data packet when the second data packet is sent before a first time interval and the first time interval is less than k times a first RTT, where the first RTT is an RTT corresponding to the third sending rate, and $0<k\leq 1$, or the processing unit is further configured to send the second data packet when the second data packet is sent before a second time interval, and the second time interval is greater than or equal to k times the first RTT, or the processing unit is further configured to send the second data packet when the second data packet is not sent.

With reference to the second aspect, in some implementations of the second aspect, the processing unit is further configured to determine that a first ACK message is not received in a first RTT after a third data packet is sent. The first ACK message is used to acknowledge that the third data packet is successfully received. The first RTT is an RTT corresponding to the third sending rate. The transceiver unit is further configured to send the third data packet.

According to a third aspect, a communication apparatus is provided, including a processor. The processor may implement the method according to any one of the first aspect and the possible implementations of the first aspect. Optionally, the communication apparatus further includes a memory. The processor is coupled to the memory, and may be configured to execute instructions in the memory, to implement the method according to any one of the first aspect or the possible implementations of the first aspect. Optionally, the communication apparatus further includes a communication interface, and the processor is coupled to the communication interface. In embodiments of this disclosure, the communication interface may be a transceiver, a pin, a circuit, a bus, a module, or a communication interface of another type. This is not limited.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a fourth aspect, a processor is provided, including an input circuit, an output circuit, and a processing circuit. The processing circuit is configured to receive a signal by using the input circuit, and transmit a signal by using the output circuit, to enable the processor to perform the method according to any one of the first aspect and the possible implementations of the first aspect.

In a specific implementation process, the processor may be one or more chips, the input circuit may be an input pin, the output circuit may be an output pin, and the processing circuit may be a transistor, a gate circuit, a trigger, any logic circuit, or the like. The input signal received by using the input circuit may be received and input by using, for example, but not limited to, a receiver, the signal output by using the output circuit may be output to, for example, but not limited to, a transmitter and transmitted by using the transmitter, and the input circuit and the output circuit may be a same circuit, where the circuit is used as the input circuit and the output circuit at different moments. Specific implementations of the processor and the various circuits are not limited in embodiments of this disclosure.

According to a fifth aspect, a computer program product is provided. The computer program product includes a computer program (or a code or instructions). When the computer program is run, a computer is enabled to perform the method according to any one of the first aspect and the possible implementations of the first aspect.

According to a sixth aspect, a computer-readable storage medium is provided. The computer-readable storage medium stores a computer program (or a code or instructions). When the computer program is run on a computer, the computer is enabled to perform the method according to any one of the first aspect and the possible implementations of the first aspect.

DESCRIPTION OF EMBODIMENTS

The following describes technical solutions of this disclosure with reference to accompanying drawings.

The technical solutions in embodiments of this disclosure are applied to various communication systems, for example, a Long-Term Evolution (LTE) system, an LTE frequency-division duplex (FDD) system, an LTE time-division duplex (TDD) system, a $5^{th}$ generation (5G) communication system, a future communication system (for example, a $6^{th}$ generation (6G) communication system), or a system integrating a plurality of communication systems. This is not limited in embodiments of this disclosure. 5G may also be referred to as New Radio (NR).

Figure 1:
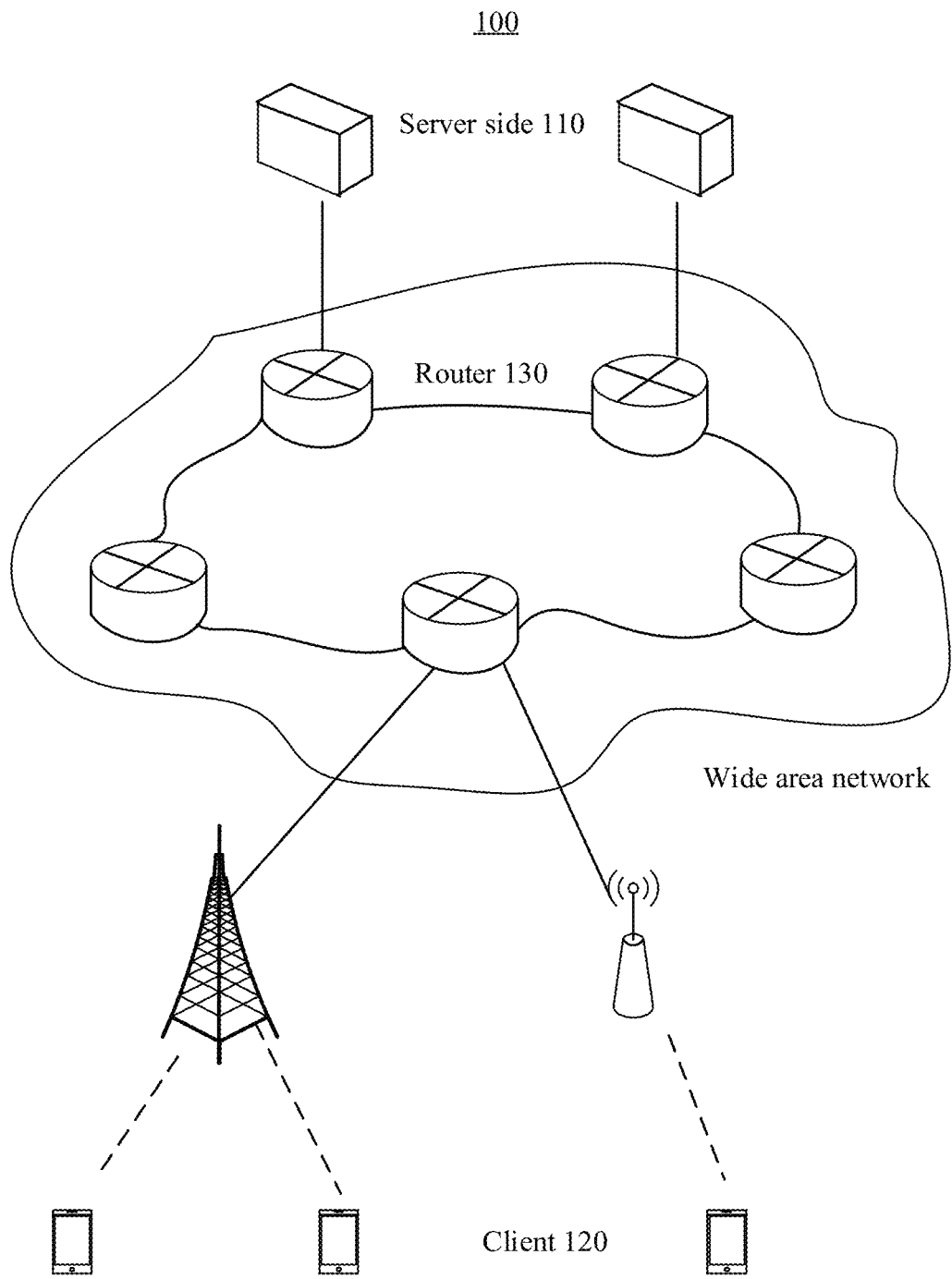
FIG. 1 is a schematic diagram of a transmission architecture of a wireless communication system to which an embodiment of this disclosure is applicable.

FIG. 1 is a schematic diagram of a transmission architecture of a wireless communication system 100 to which an embodiment of this disclosure is applicable.

As shown in FIG. 1, the wireless communication system 100 may include a server side 110, a client 120, and a router 130.

The server side is a server, and the client is a mobile device end, and may be a terminal device or a personal computer (PC). A link between the client and the server passes through a wide area network. An intermediate router is a network device. The network device can be a device that supports a CAR mechanism or a common device that does not support the CAR mechanism. A network scale is not limited, provided that an application layer of a transmitting end and an application layer of a receiving end can work according to a data sending method provided in this disclosure.

The technical solutions provided in embodiments of this disclosure are applied to various communication scenarios, for example, are applied to one or more of the following communication scenarios: Enhanced Mobile Broadband (eMBB) communication, Ultra-Reliable Low-Latency Communications (URLLC), machine type communication (MTC), Massive MTC (mMTC), device-to-device (D2D) communication, vehicle-to-everything (V2X) communication, vehicle-to-vehicle (V2V) communication, vehicle-to-network (V2N) communication, vehicle-to-infrastructure (V2I) communication, vehicle-to-pedestrian (V2P) communication, internet of things (IoT), and the like. Optionally, mMTC may include one or more of the following types of communication: communication in an industrial wireless sensor network (IWSN), communication in a video surveillance scenario, communication with a wearable device, and the like.

The terminal device in embodiments of this disclosure may also be referred to as a terminal or a user equipment (UE). The terminal may be a device with a wireless transceiver function. The terminal may be deployed on land, including an indoor device, an outdoor device, a handheld device, and/or a vehicle-mounted device, may be deployed on water (for example, on a ship), or may be deployed in the air (for example, on an airplane, a balloon, or a satellite). The terminal device may be UE. The UE includes a handheld device, vehicle-mounted device, wearable device, or computing device with a wireless communication function. For example, the UE may be a mobile phone, a tablet computer, or a computer with a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, and/or the like.

The network device in embodiments of this disclosure includes a router or a base station, and may be a device that is deployed in a radio access network and that can perform wireless communication with a terminal device. The base station may be in a plurality of forms, for example, a macro base station, a micro base station, a relay station, or an access point. The base station in embodiments of this disclosure may be a base station in a 5G system, a base station in an LTE system, or a base station in another system. This is not limited. The base station in the 5G system may also be referred to as a transmission reception point (TRP) or a next generation NodeB (gNB or gNodeB). The base station may be an integrated base station, or may be a base station that is separated into a plurality of network elements. This is not limited. For example, the base station is a base station in which a central unit (CU) and a distributed unit (DU) are separated, that is, the base station includes the CU and the DU.

In embodiments of this disclosure, "/" may indicate an "or" relationship between associated objects. For example, A/B may indicate A or B. The term "and/or" may be used to describe three relationships between associated objects. For example, A and/or B may indicate the following three cases: only A exists, both A and B exist, and only B exists, where A and B may be singular or plural. To facilitate description of the technical solutions in embodiments of this disclosure, in embodiments of this disclosure, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this disclosure, a term such as "example" or "for example" indicates an example, an illustration, or a description. Any embodiment or design scheme described as an "example" or "for example" should not be explained as being more preferred or having more advantages than another embodiment or design scheme. Use of the term such as "example" or "for example" is intended to present a relative concept in a specific manner for ease of understanding.

In embodiments of this disclosure, "at least one (type)" may alternatively be described as "one (type) or more (types)", and "a plurality of (types)" may be two (types), three (types), four (types), or more (types). This is not limited in embodiments of this disclosure.

Ultra-fast terminal network positioning can provide an ultra-fast interconnection experience, and is an underlying basic connection technology for a future terminal. Ultra-fast terminal networks implement an optimal network experience with no packet loss and an ultra-low delay based on combined technical innovation of active network technologies of mobile terminals and servers. One of the core indicators of the future terminal is an extremely high requirement on a network delay, and therefore a low delay becomes a key point of network-based interactive services. Ultra-fast terminal networks aim at these application scenarios with ultra-low delay requirements, and provide a possible technical innovation solution.

An active congestion control mechanism can be used to ensure that data sending is adjusted packet by packet, link bandwidth is occupied fairly, without packet loss and having a low delay. However, the active congestion control mechanism requires that all devices on a link support a CAR mechanism. This requirement cannot be met on a live network. Some devices on the link may not support the CAR mechanism. Therefore, a new technical solution is required to resolve disadvantages in a dual-channel transmission mode in the existing network.

To facilitate understanding of embodiments of this disclosure, a dual-channel active congestion control mechanism is briefly described.

In the dual-channel active congestion control mechanism, packets are classified into probe packets and data packets. Logically, the probe packet and the data packet occupy a control channel and a data channel respectively for congestion control and data sending. This is a meaning of a dual-channel. Physically, the two types of packets pass through a same path.

A size of the probe packet is set to 64 bytes, and it is assumed that a size of the data packet is 1518 bytes. In this case, a ratio of the probe packet to a sum of the probe packet and the data packet is approximately 4%. For simplicity, roughly 5% of bandwidth is used to run the probe packets, and 95% of the bandwidth is used to run the data packets (the ratio here is a one-way bandwidth ratio).

Figure 2:
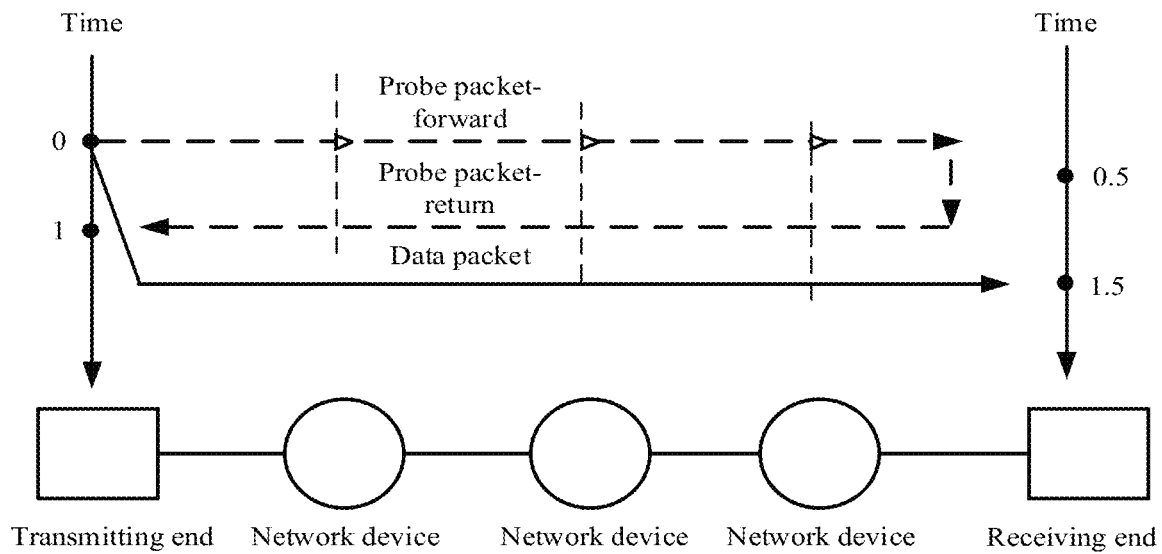
FIG. 2 is a schematic diagram of a dual-channel active congestion control process.

FIG. 2 is a schematic diagram of a dual-channel active congestion control process. An entire process of the dual-channel active congestion mechanism may be summarized as a process of packet-by-packet probing and response data sending, and the following specific steps are included.

1. A transmitting end performs probing.

The transmitting end sends a probe packet at an expected target sending rate, to request bandwidth authorization. The probe packet passes through a network device in a link hop by hop, and each network device may perform CAR limiting on the probe packets that are converged by all flows (or referred to as converged by all receiving ports) to the network device. Further, the transmitting end discards a probe packet that exceeds a capability of a transmit port. For example, the transmitting end may discard the probe packet based on that bandwidth occupied by the probe packet does not exceed 5% of total bandwidth of a link of the transmit port. In other words, the network device limits a rate of the probe packet in a forward process of the probe packet.

2. A receiving end rebounds probing. The receiving end rebounds (or returns) all received probe packets to the transmitting end, that is, the receiving end sends the received probe packets to the transmitting end. The network device does not limit a rate of the probe packet in a return process of the probe packet. After receiving the returned probe packet, the transmitting end may determine, based on a packet loss rate of the probe packet, bandwidth authorized by the link. The packet loss rate is used to represent a quantity of lost packets in a unit time.

3. The transmitting end sends data. The transmitting end sends the data based on the received probe packet. Each time the probe packet is received, the transmitting end immediately sends a corresponding data packet.

Through dual-channel active congestion control, the transmitting end first sends the probe packet once, and the transmitting end can obtain, based on the received probe packet, an accurate packet-by-packet sending interval allocated by the network device to each data flow.

The active congestion control mechanism requires all intermediate network devices (or network nodes) to configure a CAR for the forward probe packets. If there are some devices that cannot be configured with the CAR on the network, congestion occurs on these devices, and the active congestion control mechanism becomes invalid. In addition, the active congestion control mechanism cannot respond to congestion on intermediate devices configured with no CAR. This may increase a delay and even cause packet loss.

In the conventional technology, a TCP retransmission technology is used to retransmit a data packet. To facilitate understanding of embodiments of this disclosure, the technology is briefly described.

Figure 3:
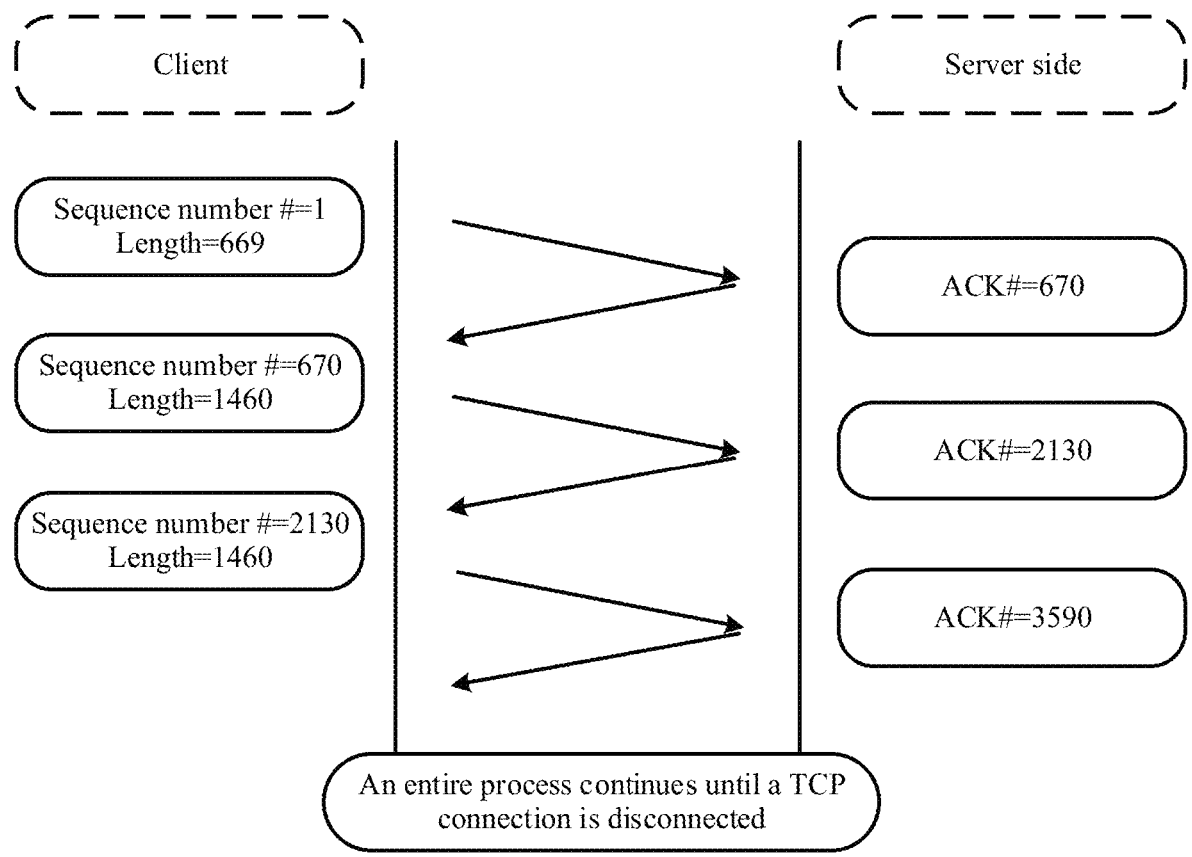
FIG. 3 is a schematic diagram of a Transmission Control Protocol (TCP) retransmission mechanism.

FIG. 3 is a schematic diagram of a TCP retransmission mechanism. ACK of a data packet is acknowledgement of a highest sequence number of the received data packet. A server side (a receiving end) returns, to a client (a transmitting end), a sequence number of a data packet that is expected to be received next time. It is assumed that a quantity of data packets sent by the client to the server side at a start moment is zero. When the client sends a 669-byte packet to the server side, the server side replies, after receiving the packet, with an ACK message with a sequence number 670, indicating that the server side has received a 669-byte sequence and a previous byte sequence. After receiving the ACK message, the client sends a 1460-byte data packet whose sequence number is 670 to the server side. After receiving the data packet, the server side replies, based on the received data packet, with an ACK message with a sequence number 2130 to the client, indicating that the server side has received a 2129-byte sequence and a previous byte sequence. After receiving the ACK message, the client sends a 1460-byte data packet whose sequence number is 2130 to the server side. After receiving the data packet, the server side replies, based on the received data packet, with an ACK message with a sequence number 3590 to the client, indicating that the server side has received a 3589-byte sequence and a previous byte sequence. The entire process repeats until a TCP connection is disconnected.

It should be understood that, in an ACK mechanism provided by the TCP, in a communication process, a separate ACK message may be sent for each data packet, or no separate ACK message may be sent for each data packet, that is, a plurality of data packets may be acknowledged at once. For example, if the receiving end sequentially receives data packets whose sequence numbers are 201, 301, and 401, the receiving end may only need to acknowledge the data packet whose sequence number is 401. Acknowledging the data packet whose sequence number is 401 also means that all data packets whose sequence numbers before 401 have been acknowledged to be received. Therefore, network utilization and transmission efficiency can be improved.

Figure 4:
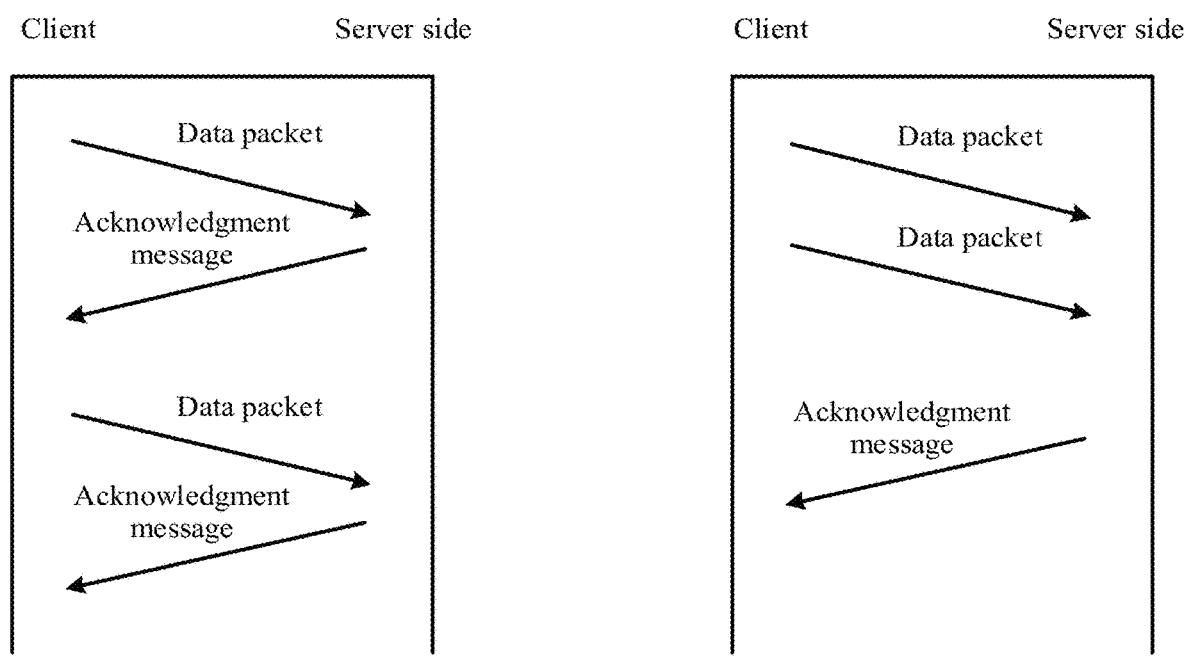
FIG. 4 is a schematic diagram of another TCP retransmission mechanism.

FIG. 4 is a schematic diagram of another TCP retransmission mechanism. A separate ACK message is sent for each data packet or an ACK message is sent for a plurality of data packets.

In a fast retransmission mechanism, if the server side receives a data packet with an out-of-order sequence number, the server side also sends ACK to the client, where the ACK is only ACK. For example, when out-of-order sequence numbers of the data packets received by the server side are 4, 6, 7, 8, and 9, the server side repeatedly sends ACK=5. In this way, the client can determine, based on ACK=5, that a data packet whose sequence number is 5 is empty. In other words, the server side does not receive the data packet whose sequence number is 5. Generally, if the client receives repeated ACK for three consecutive times, the client retransmits a corresponding data packet.

In the TCP fast retransmission mechanism, the client triggers a retransmission timeout mechanism only after receiving repeated ACK messages for three consecutive times. Triggering the sending of an ACK message requires a subsequent data packet to be received. In this case, the fast retransmission mechanism becomes invalid when sparse packets are sent. For example, the client sequentially sends data packets whose sequence numbers are 5 and 6. After the data packet whose sequence number is 5 is sent, the client may send the data packet whose sequence number is 6 after a long time. The server side repeatedly sends ACK=5 only when the server side receives the data packet whose sequence number is 6 but does not receive the data packet whose sequence number is 5. As a result, a delay for the client to retransmit the data packet whose sequence number is 5 is too long.

In the retransmission timeout mechanism, each data packet has a corresponding timer. Once the retransmission timeout is exceeded and no ACK is received, the data packet is retransmitted. The data packets for which ACK is not received are stored in a retransmission buffer. After receiving the ACK message, the data packets are deleted from the buffer. It is recommended that a minimum RTO value is 1 second (s) and a maximum RTO value be greater than 60s.

In the retransmission timeout mechanism, if the retransmission timeout is too long, a delay of a packet is greatly affected. This is unfavorable to a delay-sensitive packet.

The dual-channel active congestion control mechanism requires all intermediate network devices to configure a CAR for the forward probe packets. Furthermore, not all devices on the live network are configured with a CAR. Under such a limitation, a network device that cannot support the active congestion control mechanism on the network may cause congestion. As a result, the active congestion mechanism becomes invalid. The active congestion control mechanism cannot respond to the congestion on intermediate devices configured with no CAR. As a result, the delay increases and even packet loss occurs. However, the current TCP retransmission technology also has disadvantages such as congestion control effect is not obvious enough, and is not friendly to sparse data and delay-sensitive data.

Therefore, an embodiment of this disclosure provides a data sending method, to reduce a data transmission delay.

For ease of understanding, a network device configured with a CAR and a network device configured with no CAR are briefly described.

Figure 5A:
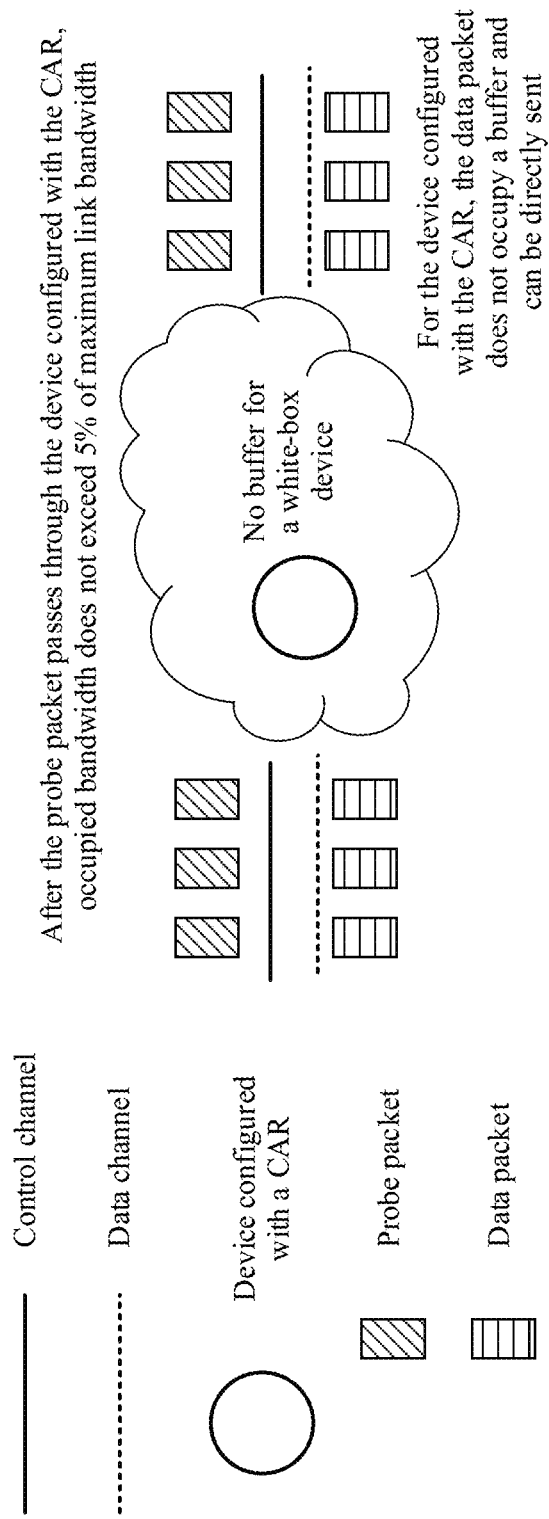
FIG. 5A is a schematic diagram of transmitting a packet by a network device configured with a CAR.
Figure 5B:
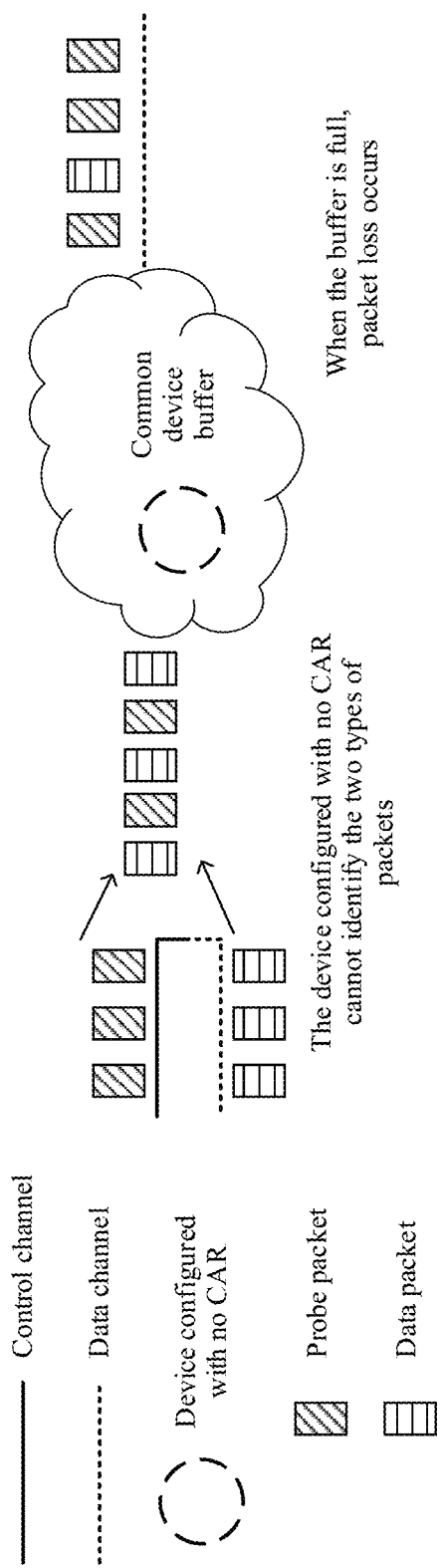
FIG. 5B is a schematic diagram of transmitting a packet by a network device configured with no CAR.

FIG. 5A is a schematic diagram of transmitting a packet by a network device configured with a CAR. As shown in FIG. 5A, the network device configured with the CAR may distinguish between two packet types: a probe packet and a data packet. For the probe packet, when link bandwidth occupied by the probe packet exceeds 5% of maximum link bandwidth, the network device randomly discards the probe packet, so that when the probe packet passes through the network device configured with the CAR, the bandwidth occupied by the probe packet does not exceed 5% of maximum link bandwidth. For the data packet, after receiving a probe packet, a transmitting end sends a data packet. The data packet does not occupy a buffer of the network device, and the data packet can be definitely directly sent by the network device. FIG. 5B is a schematic diagram of transmitting a packet by a network device configured with no CAR. The network device configured with no CAR may be referred to as a common network device. As shown in FIG. 5B, the network device configured with no CAR does not distinguish between the two types of packets. When a rate at which a common device receives a packet is greater than a sending rate, the common device stores the received packet in a buffer of the network device. As a result, a round-trip time of the probe packet increases and even congestion may occur.

When both the network device configured with the CAR and the network device configured with no CAR exist on a transmission link, the transmitting end cannot determine, based on only a CAR-based active congestion control mechanism, a packet loss caused by congestion of the network device configured with no CAR, and cannot respond to the packet loss. As a result, a large quantity of packets are lost, and a data transmission delay is increased.

Therefore, a mechanism combining active congestion control and passive congestion control is introduced in this disclosure. The passive congestion control is performed based on a RTT of a round-trip probe packet, and the active congestion control mechanism is performed based on rate limiting and packet loss of a network device configured with a CAR. A sending rate is estimated for both of the two. In this case, a smaller sending rate is an actual sending rate of the data packet. This can avoid impact caused by congestion of the common network device and adapt to the network device configured with the CAR.

Embodiments of this disclosure are applicable to a case in which network devices between the transmitting end and the receiving end are network devices configured with a CAR, or is applicable to a case in which network devices between the transmitting end and the receiving end are some network devices configured with a CAR or are some network devices configured with no CAR, or is applicable to a case in which network devices between the transmitting end and the receiving end are network devices configured with no CAR.

Figures 6, 7:
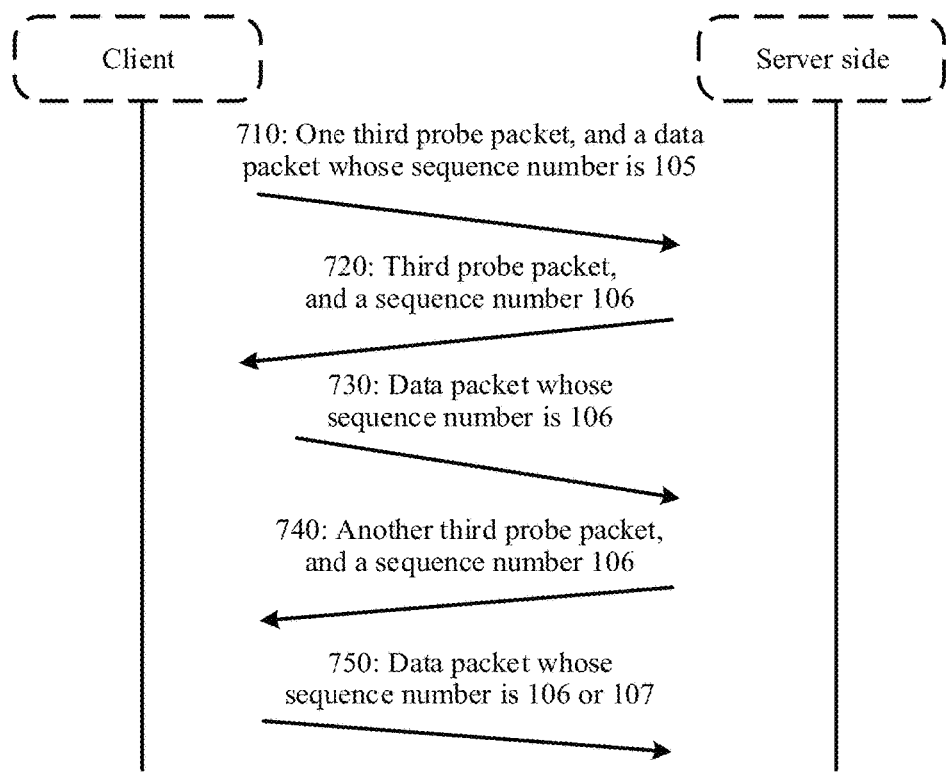
FIG. 6 is a schematic flowchart of a data sending method according to this disclosure.
FIG. 7 is a schematic interaction flowchart of a data sending method according to an embodiment of this disclosure.

FIG. 6 is a schematic flowchart of a data sending method according to this disclosure. In this embodiment of this disclosure, a transmitting end is a client, and may be a terminal device, and a receiving end is a server side, and may be a network device.

610: The transmitting end may determine a first sending rate based on multiple RTTs, where the multiple RTTs include RTTs of a plurality of first probe packets sent at different sending rates, and the first sending rate is a sending rate corresponding to an RTT that is in the multiple RTTs and that is less than a first preset threshold.

Further, the transmitting end may adjust, based on a change of the RTT, the sending rate for sending the first probe packet. A longer period of round-trip time of the first probe packet indicates more severe congestion cases in the network device used to transmit the first probe packet between the transmitting end and the receiving end, and a shorter period of round-trip time of the first probe packet indicates fewer congestion cases in the network device used to transmit the first probe packet between the transmitting end and the receiving end.

Optionally, the first probe packet includes sending time information, the sending time information indicates a sending moment of the first probe packet. The RTT is determined based on the sending moment and a receiving moment of one first probe packet. The receiving moment is a moment at which a first feedback packet is received. The first feedback packet is a feedback packet corresponding to the first probe packet.

The first probe packet sent by the transmitting end may include time information. The time information indicates a sending moment at which the transmitting end sends the first probe packet. After the first probe packet is received through link transmission, the receiving end may send the first feedback packet to the transmitting end. The first feedback packet may be the first probe packet, or the first feedback packet may include information in the first probe packet, for example, time information of the first probe packet, and the first feedback packet may further include other information sent by the receiving end to the transmitting end, for example, an ACK message in the following optional implementations. However, this disclosure is not limited thereto.

After the transmitting end receives the first feedback packet, the transmitting end may determine, based on the time information in the first feedback packet, the sending moment of the first probe packet corresponding to the first feedback packet, and then determine, based on the receiving moment of the first feedback packet, the period of RTT corresponding to the first probe packet. The RTT is a time difference between the receiving moment and the sending moment.

The time information in the first probe packet may be referred to as a timestamp.

The transmitting end may also determine the RTT of the first probe packet in another manner. For example, when sending the first probe packet to the receiving end at the third sending rate, the transmitting end records sending time of the first probe packet. When receiving the first feedback packet of the first probe packet returned by the receiving end, the transmitting end records receiving time of the first feedback packet, and subtracts the recorded sending time of the first probe packet from the recorded receiving time of the first feedback packet, to obtain an RTT of sending the first probe packet at the third sending rate. This is not limited in this disclosure.

The transmitting end may determine the first sending rate based on the multiple RTTs. For example, the transmitting end may determine, based on the multiple RTTs, the first sending rate by using a delay-based congestion control rate adjustment algorithm such as a bottleneck bandwidth and a round-trip propagation time (BBR) algorithm. A manner in which the transmitting end determines the first sending rate corresponding to the probe packet based on the multiple RTTs may be referred to as passive congestion control. However, this disclosure is not limited thereto.

620: The transmitting end may determine a second sending rate based on a plurality of packet loss rates, where the plurality of packet loss rates include packet loss rates of a plurality of second probe packets sent at different sending rates, and the second sending rate is a sending rate corresponding to a packet loss rate that is less than a second preset threshold.

It should be understood that the plurality of different sending rates at which the transmitting end sends the plurality of second probe packets may be the same as the plurality of different sending rates at which the first probe packet is sent, or the plurality of different sending rates at which the second probe packet is sent may be different from the plurality of different sending rates at which the first probe packet is sent. This is not limited in this disclosure.

Further, the transmitting end may adjust, based on the packet loss rate of the second probe packet, the sending rate for sending the second probe packet. The purpose of adjustment is to enable the transmitting end to maintain a low packet loss rate for the sent second probe packet.

The packet loss rate of the second probe packet is a quantity of lost packets of the second probe packet in a unit time.

For example, a packet sending rate (that is, a sending rate) at which the transmitting end sends the second probe packet is 400 megabits per second (Mbps), and the transmitting end may determine, based on the received second probe packet, that the packet loss rate of the second probe packet is 500 kilobits per second (kbps). The transmitting end may further determine, in this manner, a packet loss rate of the second probe packet sent at another sending rate, to obtain packet loss rates of the plurality of second probe packets sent at different sending rates, determine, from the plurality of packet loss rates, a packet loss rate less than the second preset threshold, and determine, based on the packet loss rate less than the second preset threshold, that a sending rate of the second probe packet corresponding to the packet loss rate is the second sending rate.

It should be noted that a sequence of performing step 610 and step 620 by the transmitting end is not limited in this disclosure. Step 610 may be performed before step 620, or may be performed after step 620, or may be simultaneously performed.

630: The transmitting end sends a third probe packet at the third sending rate, where the third probe packet is used to determine a sending interval of a data packet, and the third sending rate is a smaller value of the first sending rate and the second sending rate.

After the transmitting end determines the first sending rate based on a passive congestion control mechanism in step 610 and determines the second sending rate based on an active congestion control mechanism in step 620, the transmitting end may compare the first sending rate with the second sending rate, and determine the smaller value of the first sending rate and the second sending rate as the third sending rate, to send the third probe packet.

It should be noted that the first probe packet, the second probe packet, and the third probe packet in this disclosure may be a same probe packet, or may be different probe packets. This is not limited in this disclosure. However, the first probe packet and the second probe packet are used to determine a sending rate for sending the third probe packet, and the third probe packet is used to determine a sending interval for sending the data packet.

After receiving the third probe packet sent by the transmitting end, the receiving end returns a second feedback packet corresponding to the third probe packet to the transmitting end. The transmitting end receives the returned second feedback packet, and immediately sends a to-be-sent data packet to the receiving end. The second feedback packet may be the third probe packet, or the second feedback packet may include information in the third probe packet, for example, time information of the third probe packet, and the second feedback packet may further include other information sent by the receiving end to the transmitting end, for example, an ACK message in the following optional implementations. However, this disclosure is not limited thereto.

In other words, the returned second feedback packet is used to trigger the transmitting end to send a data packet, and each time the transmitting end receives a second feedback packet, the transmitting end sends a data packet to the receiving end. In this way, a sending interval of the data packet is controlled after a round-trip path is probed by using the third probe packet.

Optionally, the second feedback packet includes an ACK message, and the ACK message is used to acknowledge whether a data packet sent before the third feedback packet is sent is successfully received.

After receiving the second feedback packet, the transmitting end may determine the data packet has been successfully received.

The second feedback packet carries the ACK message of the data packet, and the transmitting end can quickly determine the data packet that is not successfully received, so that fast retransmission of the data packet can be implemented. No matter whether the data packet is sparse or dense, there is no need to wait for a long retransmission timeout, and transmission delay of the data packet can be reduced.

Optionally, the ACK message includes identification information of a first data packet and/or identification information of a second data packet. The first data packet is a last data packet that is successfully received before the second feedback packet, and the second data packet is a next to-be-received data packet.

The second data packet may be referred to as a next data packet that the receiving end expects to receive.

As an example but not a limitation, the identification information of the data packet may be a sequence number of the data packet.

For example, the transmitting end sequentially sends data packets whose sequence numbers are 101, 102, and 103 to the receiving end. If the receiving end receives the data packets whose sequence numbers are 101, 102, and 103, the receiving end sends, to the transmitting end, the second feedback packet that may include ACK messages of the data packets whose sequence numbers are 101, 102, and 103. For example, if the sequence numbers of the data packets sent by the transmitting end are increasing, the second feedback packet sent by the receiving end to the transmitting end may include only the sequence number 103, indicating that the data packet whose sequence number is 103 and data packets whose sequence number is before 103 have been received.

Optionally, the transmitting end sends a third data packet, and if the transmitting end determines that a first ACK message is not received in a first RTT after the third data packet is sent, the transmitting end sends the third data packet. The first ACK message is used to acknowledge that the third data packet is successfully received, and the first RTT is an RTT corresponding to the third sending rate.

In other words, if the transmitting end does not receive the ACK message of the sent data packet in the RTT corresponding to the third sending rate, the transmitting end resends the sent data packet.

For example, the transmitting end sends a data packet whose sequence number is 105, but does not receive a corresponding ACK message in the first RTT after sending the data packet whose sequence number is 105. The transmitting end may consider that the data packet whose sequence number is 105 fails to be sent, and the transmitting end resends the data packet whose sequence number is 105.

Optionally, the third data packet is a high-priority data packet.

For example, the data packet may be classified into a plurality of priorities based on a delay requirement, a reliability requirement, and the like of the data packet. The third data packet may be a high-priority data packet with a high delay requirement. After sending the third data packet, if the transmitting end does not receive, in one first RTT, a probe packet including the first ACK message, the transmitting end sends the third data packet again. A transmission delay of the third data packet can be reduced, to meet a delay requirement of the third data packet.

In a current retransmission timeout mechanism, after sending a data packet, if the transmitting end does not receive a corresponding ACK message within a preset retransmission timeout, the transmitting end sends the data packet again. The retransmission timeout is preset or preconfigured at the transmitting end, and cannot be adjusted based on a link transmission status. Therefore, the retransmission timeout is usually set to large duration that is usually applicable. However, in this disclosure, retransmission time is determined based on the link transmission status, and further, based on an RTT of a probe packet, so that a data packet retransmission delay can be reduced.

In specific implementation, when the ACK message in the second feedback packet includes the identification information of the second data packet, the transmitting end may determine, based on the identification information of the second data packet in the ACK message, that a next data packet that is expected to be received is the second data packet. The data sending method provided in this embodiment of this disclosure may further include the following optional implementations.

Optionally, the transmitting end determines that the second data packet is sent before a first time interval, and the first time interval is less than or equal to k times a first RTT, where the first RTT is an RTT corresponding to the third sending rate, and 0<k≤1. The transmitting end sends a next to-be-sent data packet.

In other words, the transmitting end may determine that the first time interval is a time interval between a moment at which the transmit end sends the second data packet and a moment at which the transmit end receives the first feedback packet, and the transmitting end compares the first time interval with the size of k times the first RTT. If the first time interval is less than or equal to k times the first RTT, it may be considered that the second data packet is in a normal data transmission process, and a next data packet may be sent.

For example, the first RTT is T, and k may be 0.5. The transmitting end may determine that the duration for which the second data packet has been sent is T1. The transmitting end compares T1 with 0.5T, that is, the transmitting end compares T1 with half-way transmission time of the third probe packet. If T1 is less than or equal to 0.5T, it may be considered that the second data packet is still transmitted in the link, is not transmitted to the receiving end, and may be transmitted to the receiving end after a period of time. Therefore, the transmitting end may send a next data packet.

Optionally, the transmitting end determines that the second data packet is sent before a second time interval, and the second time interval is greater than or equal to k times the first RTT, where 0<k≤1, and the transmitting end sends the second data packet.

In other words, the transmitting end may determine that duration from the second data packet is the second time interval, and the transmitting end compares the second time interval with the size of k times the first RTT. If the first time interval is greater than or equal to k times the first RTT, it may be considered that the second data packet is not successfully received, and the transmitting end may send the second data packet again. Fast retransmission can be implemented, and a packet transmission delay can be reduced.

Optionally, the transmitting end determines that the second data packet is not sent, and the transmitting end sends the second data packet.

If the transmitting end determines that the second data packet that the receiving end expects to receive has not been sent, the transmitting end sends the second data packet.

FIG. 7 is a schematic interaction flowchart of a data sending method according to an embodiment of this disclosure. In the embodiment shown in FIG. 7, an example in which the transmitting end is a client and the receiving end is a server side is used for description.

710: The client sends a plurality of third probe packets at a third sending rate, and sends a data packet whose sequence number is 105.

720: The server side receives a third probe packet (which may be denoted as a third probe packet 1) from the client, and returns a second feedback packet 1 to the client, where the second feedback packet 1 is a feedback packet corresponding to the third probe packet 1, and the returned second feedback packet 1 includes a sequence number 106 of a data packet.

The data packet whose sequence number is 106 is a next data packet that the server side expects to receive.

730: The client receives the second feedback packet 1 returned by the server side, and determines, based on a sequence number of a data packet in the second feedback packet 1, that a next data packet that the server side expects to receive is the data packet whose sequence number is 106.

The client may determine whether to send the data packet whose sequence number is 106. If the client determines that the data packet whose sequence number is 106 has not been sent, the client sends the data packet whose sequence number is 106. 740: The server side receives another third probe packet (which may be denoted as a third probe packet 2) sent by the client, and returns a second feedback packet 2 corresponding to the third probe packet 2 to the client, where the second feedback packet 2 includes a sequence number 106 of a packet.

In other words, a sequence number of a next data packet expected by the server side is still 106.

750: The client receives the second feedback packet 2, and determines, based on a sequence number of a data packet in the second feedback packet 2, that a next data packet that the server side expects to receive is the data packet whose sequence number is 106.

The client may determine whether to send the data packet whose sequence number is 106. The client determines that the data packet whose sequence number is 106 has been sent before a time interval A. The client compares the time interval A with 0.5T, where T is an RTT of the third probe packet. That is, in this embodiment, k=0.5, but this disclosure is not limited thereto.

If the time interval A is less than or equal to 0.5T, a next to-be-sent data packet is sent by the client, or if the time interval A is greater than 0.5T, the client sends the data packet whose sequence number is 106 again.

In the technical solution in this embodiment of this disclosure, the transmitting end determines, based on a period of round-trip time of a first probe packet, a first sending rate corresponding to the first probe packet with a small period of round-trip time. A smaller period of round-trip time indicates fewer congestion cases of the first probe packet on a transmission link, that is, a shorter transmission delay. The transmitting end further determines, based on a packet loss rate of a second probe packet, a second sending rate corresponding to a smaller packet loss rate. A smaller packet loss rate indicates fewer congestion cases of the second probe packet on a transmission link, and a shorter transmission delay. The transmitting end may use a minimum value of the first sending rate and the second sending rate as the third sending rate for sending the third probe packet used to determine a sending interval of a data packet, so that congestion on the transmission link can be effectively reduced, and a data transmission delay can be reduced.

The method provided in embodiments of this disclosure is described above in detail with reference to FIG. 6 and FIG.

7. The following describes an apparatus provided in embodiments of this disclosure. To implement functions in the method provided in the foregoing embodiments of this disclosure, each network element may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 8:
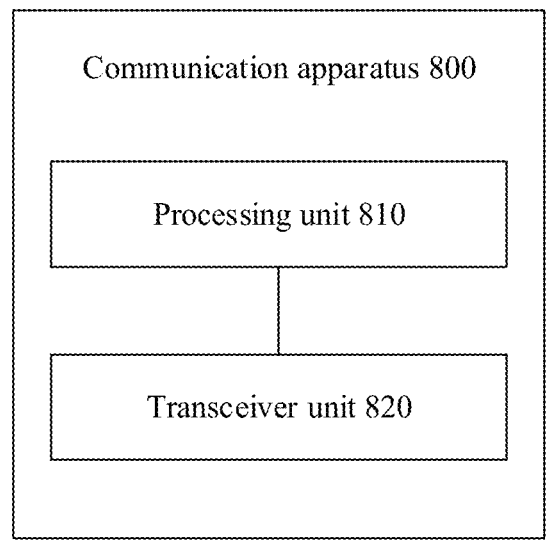
FIG. 8 is a schematic block diagram of a communication apparatus according to an embodiment of this disclosure.

FIG. 8 is a schematic block diagram of a communication apparatus according to an embodiment of this disclosure. As shown in FIG. 8, the communication apparatus 800 may include a processing unit 810 and a transceiver unit 820.

The communication apparatus 800 may correspond to the transmitting end in the foregoing method embodiments, or may be disposed (or configured to) a chip at the transmitting end, or may be another apparatus, module, circuit, unit, or the like that can implement a method of the transmitting end.

It should be understood that the communication apparatus 800 may correspond to the transmitting end in the method 600 according to embodiments of this disclosure. The communication apparatus 800 may include units configured to perform the methods performed by the transmitting end in the methods in FIG. 6 and FIG. 7. In addition, the units in the communication apparatus 800 and the foregoing other operations and/or functions are separately intended to implement corresponding procedures in the method in FIG. 6 and FIG. 7.

It should be further understood that, when the communication apparatus 800 is the chip disposed (or configured) at the transmitting end, the transceiver unit 820 in the communication apparatus 800 may be an input/output interface or a circuit in the chip, and the processing unit 810 in the communication apparatus 800 may be a processor in the chip.

Figure 9:
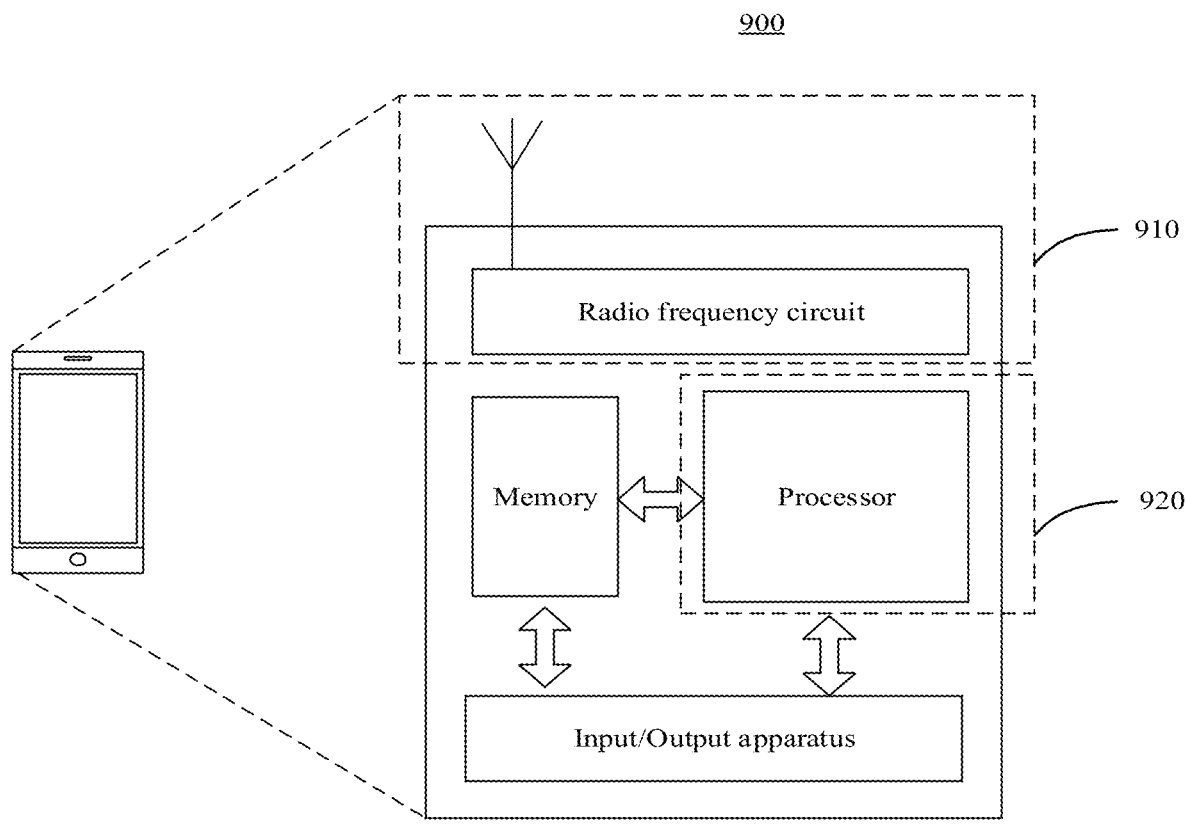
FIG. 9 is a schematic diagram of a structure of a communication device according to an embodiment of this disclosure.

It should be understood that the transceiver unit 820 in the communication apparatus 800 may be implemented by a communication interface (for example, a transceiver or an input/output interface), for example, may correspond to a transceiver 910 in the communication device 900 shown in FIG. 9. The processing unit 810 in the communication apparatus 800 may be implemented by at least one processor, for example, may correspond to a processor 920 in the communication device 900 shown in FIG. 9. Alternatively, the processing unit 810 in the communication apparatus 800 may be implemented by using at least one logic circuit.

It should be further understood that a specific process in which the units perform the foregoing corresponding steps is described in detail in the foregoing method embodiments, and for brevity, details are not described herein.

FIG. 9 is a schematic diagram of a structure of a communication device 900 according to an embodiment of this disclosure. The communication device 900 may be used in the system shown in FIG. 1, to perform functions of the transmitting end in the foregoing method embodiments. As shown in the figure, the communication device 900 includes a processor 920 and a transceiver 910. Optionally, the communication device 900 further includes a memory. The processor 920, the transceiver 910, and the memory may communicate with each other through an internal connection path, to transfer a control signal and/or a data signal. The memory is configured to store a computer program, and the processor 920 is configured to execute the computer program in the memory, to control the transceiver 910 to receive and send a signal.

The processor 920 and the memory may be integrated into one processing apparatus. The processor 920 is configured to execute the program code stored in the memory to implement the foregoing functions. During specific implementation, the memory may alternatively be integrated into the processor 920, or may be independent of the processor 920. The processor 920 may correspond to the processing unit in FIG. 8.

The transceiver 910 may correspond to the transceiver unit in FIG. 8. The transceiver 910 may include a receiver (or a receiver machine or a receiver circuit) and a transmitter (or a transmitter machine or a transmitter circuit). The receiver is configured to receive a signal, and the transmitter is configured to transmit a signal.

It should be understood that the communication device 900 shown in FIG. 9 can implement processes related to the transmitting end in the method embodiments shown in FIG. 6 and FIG. 7. Operations and/or functions of modules in the communication device 900 are separately intended to implement corresponding procedures in the foregoing method embodiments. For details, refer to the descriptions in the foregoing method embodiments. To avoid repetition, detailed descriptions are properly omitted herein.

The processor 920 may be configured to perform an action that is implemented inside the transmitting end and that is described in the foregoing method embodiment, and the transceiver 910 may be configured to perform an action of sending to the receiving end or receiving from the receiving end that is performed by the transmitting end and that is described in the foregoing method embodiment. For details, refer to the descriptions in the foregoing method embodiments. Details are not described herein again.

Optionally, the communication device 900 may further include a power supply configured to supply power to various devices or circuits at the transmitting end.

In addition, to improve functions of the transmitting end, the communication device 900 may further include an input/output apparatus, for example, include one or more of an input unit, a display unit, an audio circuit, a camera, a sensor, and the like, and the audio circuit may further include a speaker, a microphone, and the like.

This embodiment of this disclosure further provides a processing apparatus, including a processor and a (communication) interface. The processor is configured to perform the method according to any one of the foregoing method embodiments.

It should be understood that the processing apparatus may be one or more chips. For example, the processing apparatus may be a field-programmable gate array (FPGA), an application-specific integrated chip (ASIC), a system on chip (SoC), a central processing unit (CPU), a network processor (NP), a digital signal processing (DSP), a microcontroller (MCU), a programmable logic device (PLD), or another integrated chip.

According to the methods provided in embodiments of this disclosure, this disclosure further provides a computer program product. The computer program product includes computer program code. When the computer program code is executed by one or more processors, an apparatus including the processor is enabled to perform the methods in the embodiments shown in FIG. 6 and FIG. 7.

All or a part of the technical solutions provided in embodiments of this disclosure may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, a network device, a terminal device, a core network device, machine learning device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium, or the like.

According to the methods provided in embodiments of this disclosure, this disclosure further provides a computer-readable storage medium. The computer-readable storage medium stores program code. When the program code is executed by one or more processors, an apparatus including the processor is enabled to perform the methods in the embodiments shown in FIG. 6 and FIG. 7.

According to the methods provided in embodiments of this disclosure, this disclosure further provides a system, including the foregoing one or more transmitting ends. The system may further include the foregoing one or more receiving ends.

In the several embodiments provided in this disclosure, it should be understood that the disclosed system, apparatus, and method may be implemented in other manners. For example, the described apparatus embodiment is only an example. For example, division into the units is only logical function division and may be other division in actual implementation. For example, a plurality of units or assemblies may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:
   determining a first sending rate based on multiple round-trip times (RTTs) of first probe packets sent at different sending rates, wherein the first sending rate corresponds to a first RTT that is in the multiple RTTs and that is less than a first preset threshold;
   determining a second sending rate based on packet loss rates of second probe packets sent at different sending rates, wherein the second sending rate corresponds to a first packet loss rate that is in the packet loss rates and that is less than a second preset threshold; and
   sending a third probe packet at a third sending rate, wherein the third probe packet determines a sending interval of a first data packet, and wherein the third sending rate is a smaller value of the first sending rate and the second sending rate.

2. The method of claim 1, wherein each of the first probe packets comprises sending time information indicating a sending moment of a corresponding first probe packet, and wherein the method further comprises:
   receiving, at a receiving moment, a feedback packet corresponding to the corresponding first probe packet; and
   determining the first RTT based on the sending moment and the receiving moment.

3. The method of claim 1, further comprising receiving a feedback packet corresponding to the third probe packet, wherein the feedback packet comprises an acknowledgement (ACK) message, and wherein the ACK message to acknowledges whether a second data packet sent before the third probe packet is successfully received.

4. The method of claim 3, wherein the ACK message comprises first identification information of a third data packet or second identification information of a fourth data packet, wherein the third data packet is a last data packet that is successfully received before the feedback packet, and wherein the fourth data packet is a next to-be-received data packet.

5. The method of claim 4, wherein the ACK message comprises the second identification information, wherein the method further comprises sending a next to-be-sent data packet when the fourth data packet is sent before a time interval and the first time interval is less than k times a second RTT, wherein the first second RTT corresponds to the third sending rate, and wherein 0<k≤1.

6. The method of claim 4, wherein the ACK message comprises the second identification information, wherein the method further comprises sending the fourth data packet when the fourth data packet is sent before a time interval, wherein the time interval is greater than or equal to k times a second RTT, and wherein 0<k≤1.

7. The method of claim 4, wherein the ACK message comprises the second identification information, and wherein the method further comprises sending the fourth data packet when the fourth data packet is not sent.

8. The method of claim 1, further comprising:
   identifying that an first acknowledgement (ACK) message is not received in a second RTT after a second data packet is sent, wherein the first second RTT corresponds to the third sending rate, and wherein the ACK message acknowledges that the second data packet is successfully received; and
   sending, in response to identifying that the ACK message is not received in the second RTT after the second data packet is sent, the second data packet.

9. A communication device comprising:
a memory configured to store instructions; and
one or more processors coupled to the memory and configured to execute the instructions to cause the communication device to:
determine a first sending rate based on multiple round-trip times (RTTs) of first probe packets sent at different sending rates, wherein the first sending rate corresponds to a first RTT that is in the multiple RTTs and that is less than a first preset threshold;
determine a second sending rate based on packet loss rates of second probe packets sent at different sending rates, wherein the second sending rate corresponds to a first packet loss rate that is in the packet loss rates and that is less than a second preset threshold; and
send a third probe packet at a third sending rate, wherein the third probe packet determines a sending interval of a first data packet, and wherein the third sending rate is a smaller value of the first sending rate and the second sending rate.

10. The communication device of claim 9, wherein each of the first probe packets comprises sending time information indicating a sending moment of a corresponding first probe packet, and wherein the one or more processors are further configured to execute the instructions to cause the communication device to:
receive, at a receiving moment, a feedback packet corresponding to the corresponding first probe packet; and
determine the first RTT based on the sending moment and the receiving moment.

11. The communication device of claim 9, wherein the one or more processors are further configured to execute the instructions to cause the communication device to receive a feedback packet corresponding to the third probe packet, wherein the feedback packet comprises an acknowledgement (ACK) message, and wherein the ACK message acknowledges whether a second data packet sent before the third probe packet is successfully received.

12. The communication device of claim 11, wherein the ACK message comprises first identification information of a third data packet or second identification information of a fourth data packet, wherein the third data packet is a last data packet that is successfully received before the feedback packet, and wherein the fourth data packet is a next to-be-received data packet.

13. The communication device of claim 12, wherein the ACK message comprises the second identification information, and wherein the one or more processors are further configured to execute the instructions to cause the communication device to:
send a next to-be-sent data packet when the fourth data packet is sent before a first time interval and the first time interval is less than k times a second RTT, wherein the second RTT corresponds to the third sending rate, and wherein 0<k≤1;
send the fourth data packet when the fourth data packet is sent before a second time interval, wherein the second time interval is greater than or equal to the k times the second RTT; or
send the fourth data packet when the fourth data packet is not sent.

14. The communication device of claim 9, wherein the one or more processors are further configured to execute the instructions to cause the communication device to:
identify that an first acknowledgement (ACK) message is not received in a second RTT after a second data packet is sent, wherein the second RTT corresponds to the third sending rate, and wherein the ACK message acknowledges that the second data packet is successfully received; and
send, in response to identifying that the ACK message is not received in the second RTT after the second data packet is sent, the second data packet.

15. A computer program product comprising computer-executable instructions that are stored on a non-transitory computer-readable storage medium and that, when executed by one or more processors, cause a communication device to:
determine a first sending rate based on multiple round-trip times (RTTs) of first probe packets sent at different sending rates, wherein the first sending rate corresponds to a first RTT that is in the multiple RTTs and that is less than a first preset threshold;
determine a second sending rate based on packet loss rates of second probe packets sent at different sending rates, wherein the second sending rate corresponds to a first packet loss rate that is in the packet loss rates and that is less than a second preset threshold; and
send a third probe packet at a third sending rate, wherein the third probe packet determines a sending interval of a first data packet, and wherein the third sending rate is a smaller value of the first sending rate and the second sending rate.

16. The computer program product of claim 15, wherein each of the first probe packets comprises sending time information a sending moment of a corresponding first probe packet, wherein the computer-executable instructions further cause the communication device to:
receive, at a receiving moment, a feedback packet corresponding to the corresponding first probe packet; and
determine the first RTT based on the sending moment and the receiving moment.

17. The computer program product of claim 15, wherein the computer-executable instructions further cause the communication device to receive a feedback packet corresponding to the third probe packet, wherein the feedback packet comprises an acknowledgement (ACK) message, and wherein the ACK message acknowledges whether a second data packet sent before the third probe packet is successfully received.

18. The computer program product of claim 17, wherein the ACK message comprises first identification information of a first third data packet and/or or second identification information of fourth data packet, wherein the third data packet is a last data packet that is successfully received before the feedback packet, and wherein the fourth data packet is a next to-be-received data packet.

19. The computer program product of claim 18, wherein the ACK message comprises the second identification information, and wherein the computer-executable instructions further cause the communication device to:
send a next to-be-sent data packet when the fourth data packet is sent before a first time interval and the first time interval is less than k times a second RTT, wherein the second RTT corresponds to the third sending rate, and wherein 0<k≤1;
send the fourth data packet when the fourth data packet is sent before a second time interval, wherein the second time interval is greater than or equal to the k times the second RTT; or
send the fourth data packet when the fourth data packet is not sent.

20. The computer program product of claim 15, wherein the computer-executable instructions further cause the communication device to:
- identify that an acknowledgement (ACK) message is not received in a first second RTT after a second data packet is sent, wherein the second RTT corresponds to the third sending rate, and wherein the ACK message acknowledges that the third second data packet is successfully received; and
- send, in response to identifying that the ACK message is not received in the second RTT after the second data packet is sent, the second data packet.

\* \* \* \* \*

UNITED STATES PATENT AND TRADEMARK OFFICE
CERTIFICATE OF CORRECTION

PATENT NO. : 12,381,827 B2
APPLICATION NO. : 18/534159
DATED : August 5, 2025
INVENTOR(S) : Haibo Zhang, Feilong Tang and Xuhui Zhang Page 1 of 1

It is certified that error appears in the above-identified patent and that said Letters Patent is hereby corrected as shown below:

In the Claims

Claim 5, Column 20, Line 45: "interval and the first time interval is less than k times a" should read "interval and the time interval is less than k times a"

Claim 5, Column 20, Line 46: "second RTT, wherein the first second RTT corresponds to the" should read "second RTT, wherein the second RTT corresponds to the"

Claim 8, Column 20, Line 59: "identifying that an first acknowledgement (ACK) mes-" should read "identifying that an acknowledgement (ACK) mes-"

Claim 8, Column 20, Line 61: "packet is sent, wherein the first second RTT corre-" should read "packet is sent, wherein the second RTT corre-"

Claim 14, Column 21, Line 66: "identify that an first acknowledgement (ACK) message is" should read "identify that an acknowledgement (ACK) message is"

Claim 16, Column 22, Line 31: "information a sending moment of a corresponding first probe" should read "information indicating a sending moment of a corresponding first probe"

Claim 18, Column 22, Line 48: "of a first third data packet and/or or second identification" should read "of a third data packet or second identification"

Claim 20, Column 23, Line 5: "received in a first second RTT after a second data" should read "received in a second RTT after a second data"

Claim 20, Column 23, Line 8: "acknowledges that the third second data packet is" should read "acknowledges that the second data packet is"

Signed and Sealed this
Ninth Day of September, 2025

Coke Morgan Stewart
*Acting Director of the United States Patent and Trademark Office*